United States Patent
Kamiya et al.

(10) Patent No.: US 7,021,727 B2
(45) Date of Patent: Apr. 4, 2006

(54) VEHICLE BRAKE SYSTEM FOR PREVENTING BRAKE NOISE

(75) Inventors: Masahiko Kamiya, Anjo (JP); Hiroshi Kondo, Chiryu (JP); Shin Sasaki, Okazaki (JP); Daizo Oba, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 10/817,882

(22) Filed: Apr. 6, 2004

(65) Prior Publication Data
US 2004/0206589 A1 Oct. 21, 2004

(30) Foreign Application Priority Data
Apr. 15, 2003 (JP) ............................. 2003-110170

(51) Int. Cl.
*B60T 8/32* (2006.01)
*F16D 65/38* (2006.01)

(52) U.S. Cl. ............... 303/191; 303/113.1; 188/73.36; 188/106 P

(58) Field of Classification Search ............... 303/6.01, 303/9.61, 20, 9, 2, 113.1, 116.1, 116.2, 191; 188/73.35, 73.36, 73.37, 106 P
See application file for complete search history.

(56) References Cited

U.S. PATENT DOCUMENTS

| | | | | |
|---|---|---|---|---|
| 3,679,030 A * | 7/1972 | Kawabe | ................ | 188/106 P |
| 3,817,584 A * | 6/1974 | Huston et al. | ........... | 188/106 P |
| 3,971,595 A * | 7/1976 | Kondo | .................... | 303/114.1 |
| 4,508,393 A * | 4/1985 | Drometer | ................. | 303/119.1 |
| 4,629,039 A * | 12/1986 | Imoto et al. | ............. | 303/113.1 |
| 4,705,323 A * | 11/1987 | Imoto et al. | ............. | 303/113.1 |
| 4,743,074 A | 5/1988 | Inoue | ......................... | 303/191 |
| 4,765,140 A * | 8/1988 | Imoto et al. | ............... | 188/72.1 |
| 6,125,974 A * | 10/2000 | Nishizawa et al. | ...... | 188/73.35 |
| 6,557,949 B1 * | 5/2003 | Tani et al. | ............... | 303/114.2 |

FOREIGN PATENT DOCUMENTS

JP A-10-329681 12/1998

* cited by examiner

*Primary Examiner*—Thomas Williams
(74) *Attorney, Agent, or Firm*—Posz Law Group, PLC

(57) ABSTRACT

There is a case where first and second pressurizing units press different portions of friction members to a brake disc so as to press the friction members to the brake disc with predetermined pressing force, thereby generating braking force. When the brake noise is generated, a distribution ratio of the pressing force is changed by changing at least one of the pressing force generated by the first pressurizing unit and the pressing force generated by the second pressurizing unit. Accordingly, when the friction member contacts the brake disc, it is possible to change pressure distributions between first portions and second portions, whereby the brake noise is reduced or suppressed.

3 Claims, 4 Drawing Sheets

VEHICLE BRAKE SYSTEM FOR PREVENTING BRAKE NOISE

CROSS REFERENCE TO RELATED APPLICATION

This application is based upon and claims the benefit of Japanese Patent Application No. 2003-110170 filed on Apr. 15, 2003, the content of which are incorporated herein by reference.

FIELD OF THE INVENTION

The present invention relates to a vehicle brake system, more particularly to a vehicle brake system suitable for suppressing a brake noise.

BACKGROUND OF THE INVENTION

A braking apparatus having two calipers for a single wheel is proposed in Japanese Patent Application Laid-Open Publication No. 62-122856. In this related art, when a brake noise is detected, while total braking force is maintained for a single wheel where the brake noise is generated, a ratio of the braking force of the two calipers is controlled, whereby generation of noise is avoided.

In this related art, objects of suppressing the brake noise and ensuring the total braking force for a single wheel are achieved. It is, however, necessary to install two pieces of calipers for a single wheel, and thus a certain installation space of a chassis part is necessary, resulting in an increased size of the apparatus. That is, the increase in size of the apparatus causes an increased cost and deteriorated kinetic performance due to increased size and weight of an unsprung chassis, thereby making installation of the apparatus difficult.

SUMMARY OF THE INVENTION

In light of the aforementioned consideration, it is an object of the present invention to execute a noise prevention control with a simplified system configuration.

A vehicle brake system according to a first aspect of the present invention involves a case where a friction member is pressed to a brake disc so as to generate braking force by pressing two different portions of the friction member with first and second pressurizing units using predetermined braking force. In this case, when a brake noise is generated, a distribution ratio of the pressing force generated by the first pressurizing unit and the pressing force generated by the second pressurizing unit is changed by changing at least one of the pressing force. This change allows a pressure distribution between first portions and second portions to be changed when the friction member contacts the brake disc. Therefore, it is possible to change a resonance state within a single independent caliper by changing a contact surface pressure distribution of the friction member, thereby suppressing the brake noise.

Therefore, a need for installing two calipers for a single wheel is eliminated, and suppression of the brake noise is realized with a simplified system. Note that the first and second pressurizing units may be pistons that press a friction member using a hydraulic pressure in a hydraulic brake, or rotational force of an electric motor may used for pressing a friction member in an electrically powered brake.

In a vehicle brake system according to a preferred form of the first aspect of the present invention, a control unit thereof controls the pressing force such that a sum of the braking force generated by the first pressurizing unit and the braking force generated by the second pressurizing unit is constant. Accordingly, the pressing force is controlled such that a total pressing force applied in a single wheel, that is, total braking force, is constant in order to suppress the brake noise. Therefore, the control described above does not change a vehicle behavior, and a driver does not feel an unpleasant sensation.

A vehicle brake system according to a second aspect of the present invention is provided with independently controlled calipers having first and second pressurizing units in one of paired left and rear front wheels and paired front and right rear wheels. Further, it is provided with a single-line connected calipers having a third pressurizing unit in the other paired wheels. Note that in each paired front and rear wheels, the independently controlled calipers or the single-line connected calipers are provided for both front and rear wheels. Moreover, a second hydraulic pressure is applied to the second pressurizing unit in the paired left front and rear wheels, and a fourth hydraulic pressure is applied to the third pressurizing unit in the paired right front and rear wheels, independently. The second hydraulic pressure is the same as the fourth hydraulic pressure. Meanwhile, a first hydraulic pressure and a third hydraulic pressure is independently applied to the first pressurizing unit on the left or the first pressurizing unit on the right.

When a brake noise is generated, the control unit controls the hydraulic pressures to be applied to the first and second pressurizing units which are arranged in the independently controlled caliper disposed on the side where the noise is generated. Accordingly, the control unit changes pressing force respectively generated by the individual pressurizing units so as to change a distribution ratio of the pressing force.

Accordingly, in the independently controlled caliper disposed on the side where the brake noise is generated, a distribution ratio of the pressing force with which the first pressurizing unit presses friction members and the pressing force with which the second pressurizing unit presses friction members is changed. This causes a change in a pressure distribution on a surface which contacts a brake disc, that is, a change in a resonance state, whereby suppressing the brake noise or even preventing the brake noise in a wheel having the independently controlled caliper. Additionally, a change in the distribution ratio of the pressing force due to a change in the pressing force respectively generated by the first and second pressurizing units simultaneously causes a change in the hydraulic pressure which is applied to the third pressurizing unit, thereby changing (that is, increasing or reducing) the pressing force generated by the third pressurizing unit. Accordingly, it is possible to suppress the brake noise or even prevent the brake noise in a wheel having the third pressurizing unit on the side where the brake noise is generated.

Moreover, it is possible to independently control the hydraulic pressures which are applied to the first to third pressurizing units (i.e., 6 units in total) disposed in the four wheels. In other word, it is possible to independently control the braking force applied to the individual wheels, with a simplified four-channel brake system, and thus there is no need for complicated system configuration.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
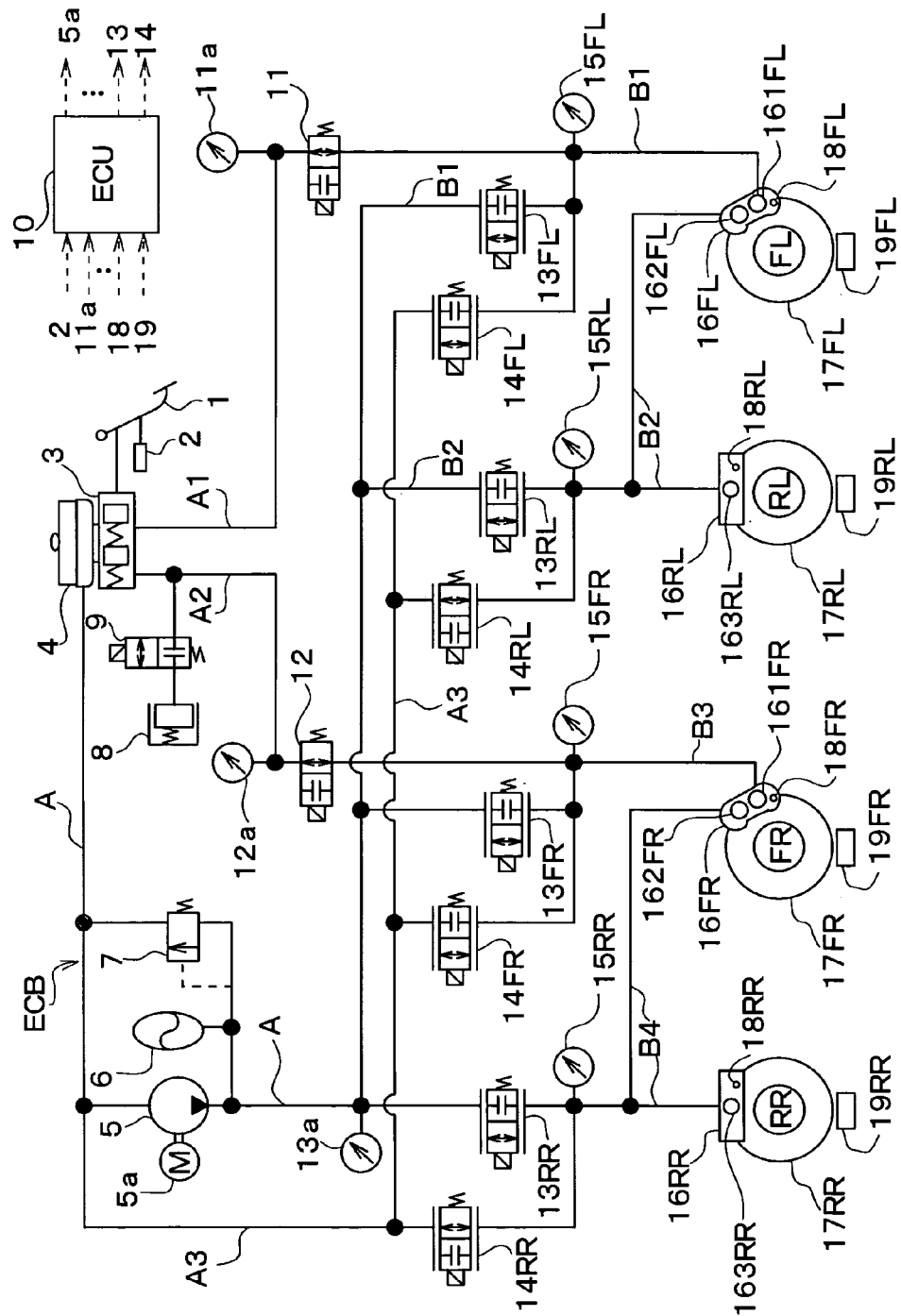
FIG. 1 shows a schematic configuration of a vehicle brake system according to a first embodiment of the present invention.

The present invention will be described further with reference to various embodiments in the drawings.

First Embodiment

A vehicle braking system according to a first embodiment of the present invention will be explained with reference to the drawings. FIG. 1 shows a schematic configuration of the first embodiment. Note that FIG. 1 shows a state where a current is not applied to any solenoid valves when a brake is not actuated.

The vehicle braking system according to the first embodiment is provided with a brake ECU (hereinafter referred to as ECU) 10. The ECU 10 controls hydraulic pressures to be applied to calipers (hereinafter referred to as independently controlled calipers) 16FL, 16RL, 16FR, and 16RR, respectively, which are provided for each of a left front wheel FL, a right front wheel FR, a left rear wheel RL, and a right rear wheel RR, based on detection signals from various sensors, so as to independently control braking force for the four wheels.

The master cylinder 3 generates a master cylinder pressure corresponding to a depression amount of a brake pedal 1. When an error occurs in a power supply system to be described later, the master cylinder 3 applies the master cylinder pressure to the left front wheel FL via a brake conduit A1 which is connected to one of fluid chambers of the master cylinder 3 and generates braking force. That is, the brake conduit A1 is connected from the fluid chamber of the master cylinder 3, via a master cut valve 11, to front pistons 161FL of the independently controlled caliper 16FL. The master cut valve 11 is a normally open valve which is communicated when normal braking is not applied and which is shut off when normal braking is applied. When an error occurs in the brake operating state, the master cut valve 11 is communicated, and applies the master pressure to the front pistons 161FL, thereby generating the braking force in the front wheels. Note that a pressure sensor 11a detects the master cylinder pressure and outputs detection signals to the ECU 10.

Further, a brake conduit A2 which is connected to the other fluid chamber of the master cylinder 3 is connected, via a master cut valve 12, to front pistons 161FR of the independently controlled caliper 16FR of the right front wheel FR. Further, the brake conduit A2 is communicated with a stroke simulator 8 via a simulator cut valve 9. In other words, when normal braking is applied, the simulator cut valve 9 is communicated so as to communicate the stroke simulator 8 with the master cylinder 3 and generates reaction force provided by the stroke simulator 8 in the brake pedal 1. Accordingly, when normal braking is applied, a driver is able to feel a pedal reaction force corresponding to the depression amount of the brake pedal 1. Moreover, the simulator cut valve 9 is shut off when a braking is not applied and when a error occurs in the power supply system, whereby the stroke simulator 8 is shut off from the master cylinder 3. Note that a stroke sensor 2 is disposed on the brake pedal 1. The stroke sensor 2 detects a depression amount of the brake pedal 1 and outputs the detection signal to the ECU 10.

The independently controlled calipers 16FL and 16FR are provided in the left front wheel FL and the right front wheel FR, respectively. Further, the single line-connected calipers 16RL and 16RR are provided in the left rear wheel RL and the right rear wheel RR. The right and left independently controlled calipers 16FL and 16FR have the same configuration, and the right and left single line-connected calipers 16RL and 16RR have also the same configuration. Further, a brake system for the left front wheel FL and the left rear wheel RL is basically the same as a brake system for the right front wheel FR and the right rear wheel RR.

In other words, a first brake conduit B1 which is communicated with the left front wheel FL has the same configuration as a third brake conduit B3 which is communicated with the right front wheel FR. Moreover, a first hydraulic pressure in the first brake conduit B1 acts in the same manner as a third hydraulic pressure in the third brake conduit B3.

Moreover, a second brake conduit B2 which is communicated with the left rear wheel RL and the left front wheel FL has the same configuration as a fourth brake conduit B4 which is communicated with the right rear wheel RR and the right front wheel FR. Moreover, a second hydraulic pressure in the second brake conduit B2 acts in the same manner as a fourth hydraulic pressure in the fourth brake conduit B4.

Therefore, an explanation will be given mainly on the brake system on the left front wheel FL and the left rear wheel RL hereafter, and only a simplified explanation will be given on the brake system on the right front wheel FR and the right rear wheel RR.

Figures 2A, 2B:
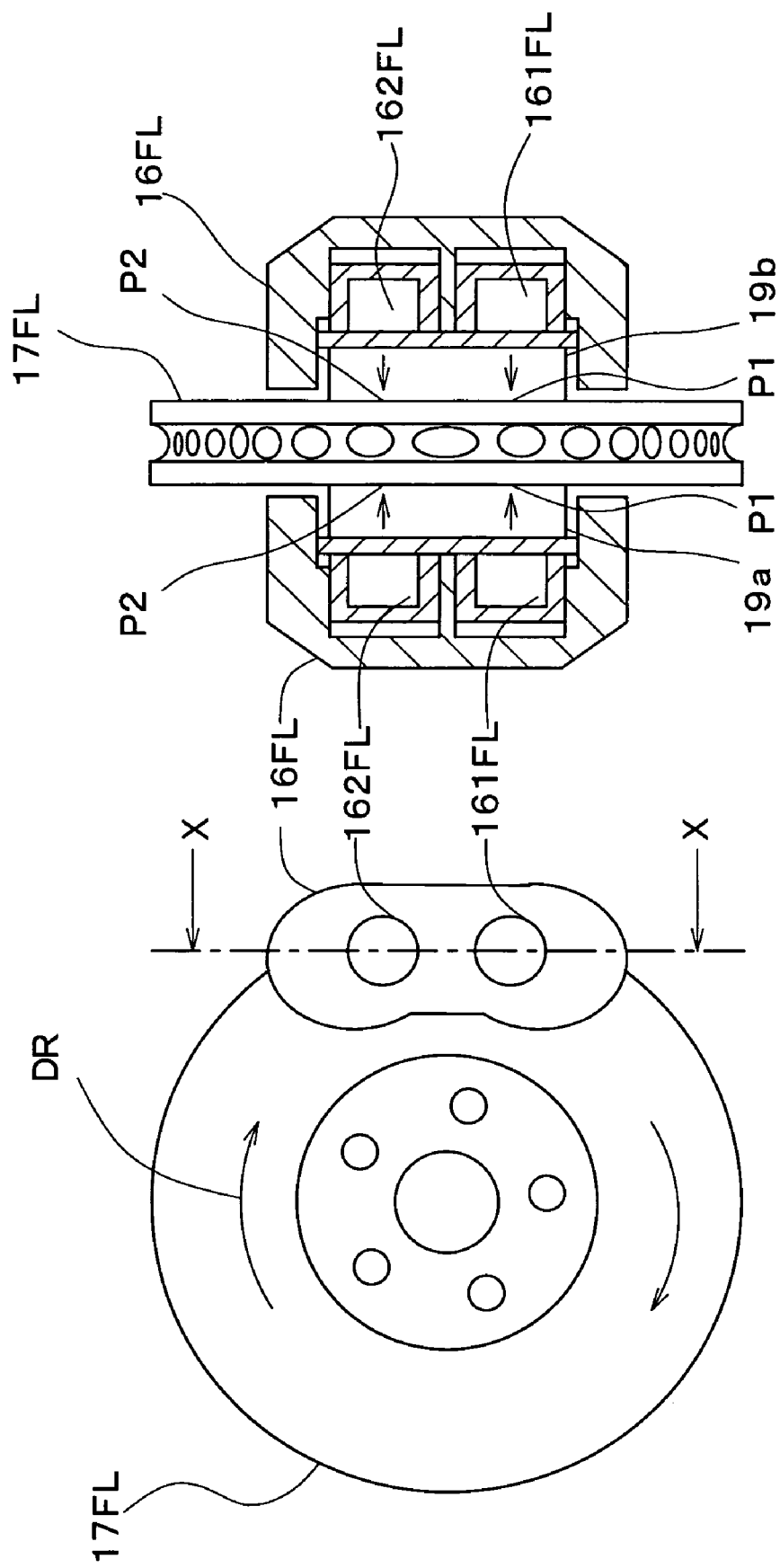
FIG. 2A is a plan view of an independently controlled caliper.
FIG. 2B is a sectional view of the caliper taken along line X—X of FIG. 2A.

FIG. 2A is a plan view of the independently controlled caliper 16FL, and FIG. 2B is a sectional view taken along line X—X in FIG. 2A. A pair of front pistons 161FL which serve as the first pressurizing unit and a pair of rear pistons 162FL which serve as a second pressurizing unit are disposed in the independent controlled caliper 16FL. The front pistons 161FL and the rear pistons 162FL are disposed at the front and the rear with respect to the rotational direction of the brake disc 17FL in the same caliper body.

That is, in the independently controlled caliper 16FL, i.e., a so called 4-pod caliper, the two pairs of pistons 161FL and 162FL are disposed so as to sandwich the brake disc 17FL. The front pistons 161FL and rear pistons 162FL press friction members 19a and 19b at first portions P1 and second portions P2, respectively, from both left and right, using pressing force which is generated by the first hydraulic pressure and pressing force which is generated by the second hydraulic pressure, respectively, whereby braking force is applied to the brake disc 17FL. Note that, since the first and second hydraulic pressures are independently applied as described later, the pressing force that presses the first portions P1 may differ from the pressing force that presses the second portions P2.

The front pistons 161FL and the rear pistons 162FL refer to pistons that are disposed at the front and the rear, respectively, with respect to the rotational direction of the brake disc 17FL in the independently controlled caliper 16FL. That is, suppose that a rotational direction DR of the brake disc 17FL as shown by an arrow in the clockwise direction is a positive direction, the pistons located on the negative side in the independently controlled caliper 16FL are called as the front pistons 161FL.

Therefore, the first portions P1 of the friction members 19a and 19b which are pressed by the front pistons 161FL contact at predetermined positions of the rotating brake disc 17FL earlier than the second portions P2 of the friction members 19a and 19b which are pressed by the rear pistons 162FL. Accordingly, for example, it is possible that the first hydraulic pressure applied to the front pistons 161FL is higher than the second hydraulic pressure applied to the rear pistons 162FL, whereby the pressing force generated by the front pistons 161FL becomes larger than the pressing force generated by the rear pistons 162FL. Accordingly, it is possible to change surface pressure distribution of the friction members 19a, 19b in the independently controlled caliper 16FL. Further, since the surface pressure applied to the front of the brake disc 17FL becomes larger, engagement of the friction members with the brake disc 17FL is improved, thereby generating more reliable braking force.

The single line-connected caliper 16RL provided in the left rear wheel RL is of a type which is used in an ordinary hydraulic brake. The caliper 16RL applies the third hydraulic pressure to the pair of rear wheel pistons 163RL that serve as the third pressurizing unit so as to press the friction members 19a and 19b (not shown) to the brake disc 17RL, thereby generating braking force.

Moreover, vibration sensors 18FL and 18RL are disposed in the independently controlled caliper 16FL of the left front wheel FL and the single line-connected caliper 16RL in the left rear wheel RL, respectively. The vibration sensors 18FL and 18RL detect vibration generated in the caliper body which is caused by the brake noise and feed detection signals to the ECU 10.

Further, wheel speed sensors 19 (19FL, 19RL, 19FR and 19RR) are disposed for wheels FL, RL, FR, and RR, respectively. The wheel speed sensors 19 detect rotational speeds of individual wheels and feed detection signals to the ECU 10.

A pump 5 is driven by a motor 5a. An intake port of the pump 5 is communicated with a reservoir 4 via a main line A. The pump 5 pumps up a brake fluid from the reservoir 4 via the main line A and discharges a high hydraulic pressure to an accumulator 6. The accumulator 6 accumulates the hydraulic pressure generated by the pump 5 and constitutes a power supply system for controlling braking. A pressure sensor 13a detects a discharge pressure of the main line A at a discharge port of the pump 5, that is, the accumulated pressure in the accumulator 6, and outputs a detection signal to the ECU 10. Note that a relief valve 7 relieves the brake fluid to the reservoir 4 when the pressure is abnormally high in the power supply system. The reservoir 4 accumulates the brake fluid for the master cylinder 3 and the power supply system.

The main line A is communicated with the first brake conduit B1 which is connected to the front pistons 161FL, and communicated with the second brake conduit B2. The second brake conduit B2 is connected to the rear wheel pistons 163RL that serve as the third pressurizing unit of the left rear wheel RL, and the rear pistons 162FL of the left front wheel FL, respectively. A first pressure boosting linear valve 13FL is disposed in the first brake conduit B1, and a second pressure boosting linear valve 13RL is disposed in the second brake conduit B2.

A return brake conduit A3 is connected via a first pressure reducing linear valve 14FL to a portion between the first pressure boosting linear valve 13FL and the front pistons 161FL of the first brake conduit B1. Also, the return brake conduit A3 is connected via a second pressure reducing linear valve 14RL to a portion between the second pressure boosting linear valve 13RL, and the rear pistons 162FL and the rear wheel pistons 163RL of the second brake conduit B2. The return brake conduit A3 is communicated with the reservoir 4.

Note that a hydraulic pressure Pf in the first brake conduit B1 and a hydraulic pressure Pr in the second brake conduit B2 are detected by pressure sensors 15FL and 15RL, and detection signals are output to the ECU 10.

Both first pressure boosting linear valve 13FL and second pressure boosting linear valve 13RL regulate a high hydraulic pressure which is introduced via the main line A by being independently linear controlled by the ECU 10 and accumulated in the accumulator 6, thereby applying the hydraulic pressure to the first brake conduit B1 and the second brake conduit B2. The first and second pressure reducing linear valves 14FL and 14RL are independently linear controlled by the ECU 10, thereby controlling the hydraulic pressures Pf and Pr in the first brake conduit B1 and the second brake conduit B2, respectively.

Specifically, in a pressure increasing status of the hydraulic pressure Pf in the first brake conduit B1, the ECU 10 linearly controls a valve opening of the first pressure boosting linear valve 13FL so as to obtain target braking force and changes its state into a regulated state, and closes the first pressure reducing linear valve 14FL and changes its state into a shut-off state. Further, in a pressure maintenance status of the hydraulic pressure Pf in the first brake conduit B1, the ECU 10 closes the first pressure boosting linear valve 13FL and changes its state into a shut-off state. Moreover, in a pressure reducing status of the hydraulic pressure Pf in the first brake conduit B1, the ECU 10 closes the first pressure boosting linear valve 13FL and changes its state into a shut-off state and linearly controls a valve opening of the first pressure reducing linear valve 14FL so as to obtain the target braking force and changes its state into a regulated state.

Accordingly, in the aforementioned pressure increasing, pressure maintenance and pressure reducing statuses, the hydraulic pressure Pf in the first brake conduit B1 is feedback controlled by detection values from a pressure sensor 15FL. Then, the front pistons 161FL of the left front wheel FL generates braking force corresponding to the thus controlled hydraulic pressure Pf.

The linear control in the pressure increasing, pressure maintenance and pressure reducing statuses of the hydraulic pressure Pr in the second brake conduit B2 executed by the second pressure boosting linear valve 13RL and the second pressure reducing linear valve RL are the same as the control for the first brake conduit B1 as described above, except that the second pressure reducing linear valve 14RL is closed and its state is changed into a communicated state. Therefore, an explanation on the control for the second brake conduit B2 thereof will be omitted.

Note that the hydraulic pressure Pr in the brake conduit B2 is also feedback controlled by detection values from a pressure sensor 15RL. The thus controlled hydraulic pressure Pr is applied both to the rear pistons 162FL of the left front wheel FL and the rear wheel pistons 163RL of the left rear wheel RL.

Accordingly, a left front wheel braking force Ff and a left rear wheel braking force Fr as expressed in Equation 1 are generated in the left front wheel FL and the left rear wheel RL, respectively.

$$Ff=Kf\cdot(Pf+Pr)$$

$$Fr=Kr\cdot Pr \quad \text{Equation 1}$$

Where, Kf is a braking force constant of the front pistons 161FL and the rear pistons 162FL of the left front wheel FL, and Kr is a braking force constant of the rear wheel pistons 163RL of the left rear wheel RL.

The ECU 10 independently calculates the target braking force Ff and Fr to be generated in the left front wheel FL and the right front wheel FR, respectively, based on the depression amount of the brake pedal 1, wheel speeds for individual wheels and the like, that are obtained from outputs from the various sensors. Further, the ECU 10 calculates the first hydraulic pressure Pf and the second hydraulic pressure Pr to be applied to the first brake conduit B1 and the second brake conduit B2 based on Equation 1, respectively. Next, the ECU 10 uses these calculated values as target values and feed-back controls detection values from the pressure sensors 15FL and 15RL.

Note that, as described above, the braking configuration which generates braking force to the right front wheel FR and the right rear wheel RR has the same configuration as the braking configuration which generates braking force to the left front wheel FL and the left rear wheel RL. In other words, components of the braking configuration for the right front wheel FR and the right rear wheel RR correspond to those of the braking configuration for the left front wheel FL and the left rear wheel RL, with the letters FL and RL being replaced by the letters FR and RR.

In the normal pressure increasing, pressure maintenance, and pressure reducing statuses, when normal braking is applied, the operational pattern of the above described first and second pressure boosting linear valves 13FL and 13RL, and the first and second pressure reducing linear valves 14FL and 14RL in the left front wheel FL and the left rear wheel RL is executed by the ECU 10. Also, the operation pattern in the first and second pressure boosting linear valves 13FR and 13RR and the first and second pressure reducing linear valves 14FR and 14RR in the front and rear wheels FR and RR on the right side is executed in a similar manner.

Next, a method of setting hydraulic pressures to be applied to individual wheels in a noise prevention brake control when the brake noise is generated is described. An explanation will be given on a case, as an example, where a brake noise is generated in either one of the left front wheel FL and the left rear wheel RL. Note that the first and second hydraulic pressures to be applied to the left front wheel FL and the left rear wheel RL are set independently from the third and fourth hydraulic pressures to be applied to the right front wheel FR and the right rear wheel RR. Therefore, a control method for the left front wheel FL and the left rear wheel RL which will be hereafter explained can be applied to the right front wheel FR and the right rear wheel RR in a similar manner.

Hereafter, the first hydraulic pressure, the second hydraulic pressure, the target braking force for the left front wheel FL and the target braking force for the left rear wheel RL are referred to as Pf, Pf*, Pr, Pr*, Ff, Ff*, Fr and Fr*, respectively.

(1) When a brake noise is generated in the left rear wheel RL and the brake noise needs to be reduced or suppressed, first, the target braking force Fr* for the rear front wheel RF is changed with respect to the initial target braking force Fr as shown in Equation 2.

$$Fr^*=Fr-\alpha \quad \text{Equation 2}$$

Where, α is a certain amount of braking force which has been predetermined required for changing a resonance state of the friction members in the single line-connected caliper 16RL of the left rear wheel RL. It can take either a positive value or a negative value.

Since the brake noise is likely to occur when the braking force is within a specified range (a noise generation region) as conventionally known, it is possible to reduce, suppress, or even prevent the brake noise by increasing or reducing the braking force such that the value of the braking force falls out of the noise generation region. Accordingly, the amount of change α as described above corresponds to an increase amount or a decrease amount of the braking force which displaces the braking force in the rear wheel pistons 163RL of the single line-connected caliper 16RL from the noise generation region to a region where a noise is not generated.

Accordingly, the second hydraulic pressure Pr* to be applied to the second brake conduit B2 is expressed as Equation 3.

$$Pr^*=Fr^*/Kr=(Fr-\alpha)/Kr \quad \text{Equation 3}$$

Note that when Pr*<0 in Equation 3, Pr* shall be assumed to be zero. In other words, α=Fr.

According to the present embodiment, in order to prevent an abnormal vehicle behavior, the total braking force of the left front wheel FL and the left rear wheel RL is made constant before and after the noise prevention brake control is executed. Therefore, the next Equation 4 is satisfied.

$$Ff+Fr=Ff^*+Fr^* \quad \text{Equation 4}$$

From Equations 2 and 4, Equation 5 is derived.

$$Ff^*=Ff+\alpha \quad \text{Equation 5}$$

Meanwhile, the target braking force Ff* after the noise prevention brake control is executed on the right front wheel FL is expressed as Equation 6. Therefore, Equation 7 is derived by substituting Equations 3 and 6 in Equation 5.

$$Ff^*=Kf(Pf^*+Pr^*) \quad \text{Equation 6}$$

$$Pf^*=(Ff+\alpha)/Kf-(Fr-\alpha)/Kr \quad \text{Equation 7}$$

As described above, it is possible to reduce or suppress the brake noise in the left rear wheel RL while maintaining a constant total braking force of the left front wheel FL and the left rear wheel RL, by changing the target value Pf* of the first hydraulic pressure and the target value Pr* of the second hydraulic pressure as expressed in Equations 7 and 3.

(2) When a brake noise is generated in the left front wheel FL and the brake noise needs to be reduced or suppressed, a difference β in braking force is provided between the front pistons 161FL and the rear pistons 162FL of the left front wheel FL. The difference β in braking force has been predetermined.

That is, a change in a distribution ratio between the braking force generated by the front pistons 161FL and the braking force generated by the rear pistons 162FL in the independently controlled caliper 16FL, causes a change in a resonance state in the independently controlled caliper 16FL. Therefore, it is possible to reduce, suppress, or even prevent the brake noise. This distribution ratio between the front and the rear of the vehicle corresponds to provision of a difference β between the braking force generated by the front pistons 161FL and the braking force generated by the rear pistons 162FL. Therefore, the difference β in braking force may be set to be (a) an amount of increase in the braking force of one of the two pairs of front pistons and rear pistons=an amount of decrease in braking force of the other pair of the pistons=β/2, while the total braking force applied in the front and the rear is made constant, or may be set by (b) increasing or reducing the braking force of at least one pair of the pistons without making the total braking force of the front and rear pistons constant.

In order to realize this difference β in braking force, as shown in Equation 8, the first and second hydraulic pressures are changed to Pf* and Pr*, respectively. At this time, the target braking force Ff* for the left front wheel FL and the target braking force Fr* for the left rear wheel RL are expressed by Equations 9 and 10, respectively.

$$\beta = Kf \cdot (Pf^* - Pr^*) \quad \text{Equation 8}$$

$$Ff^* = Kf \cdot (Pf^* + Pr^*) \quad \text{Equation 9}$$

$$Fr^* = Kr \cdot Pr^* \quad \text{Equation 10}$$

As in the same manner in the case (1) as described above, Equation 4 is used to make total braking force generated by the left front wheel FL and the left rear wheel RL constant. Using Equations 8, 9, and 10, as well as Equation 4, Equations 11 and 12 are derived.

$$Pf^* = (Ff + Fr + \beta(1 + Kr/Kf))/(2Kf + Kr) \quad \text{Equation 11}$$

$$Pr^* = (Ff + Fr - \beta)/(2Kf + Kr) \quad \text{Equation 12}$$

Note that when Pr*<0 in Equation 12, Pr* shall be assumed to be zero. Accordingly, since Ff*=β and Fr*=0 are found from Equations 8 and 9, Equation 4 is expressed as Ff*=Ff+Fr. Therefore, Equation 13 is derived from Equation 9.

$$Pf^* = (Ff + Fr)/Kf \quad \text{Equation 13}$$

As described above, it is possible to reduce or suppress the brake noise in the left front wheel FL while the total braking force of the left front wheel FL and the left rear wheel RL remains constant by changing the first and second hydraulic pressure target values Pf* and Pr* as expressed in Equations 11 and 12, respectively, or by changing them as Equation 13 and Pr*=0, respectively, in the case of Pr*<0.

Figure 3:
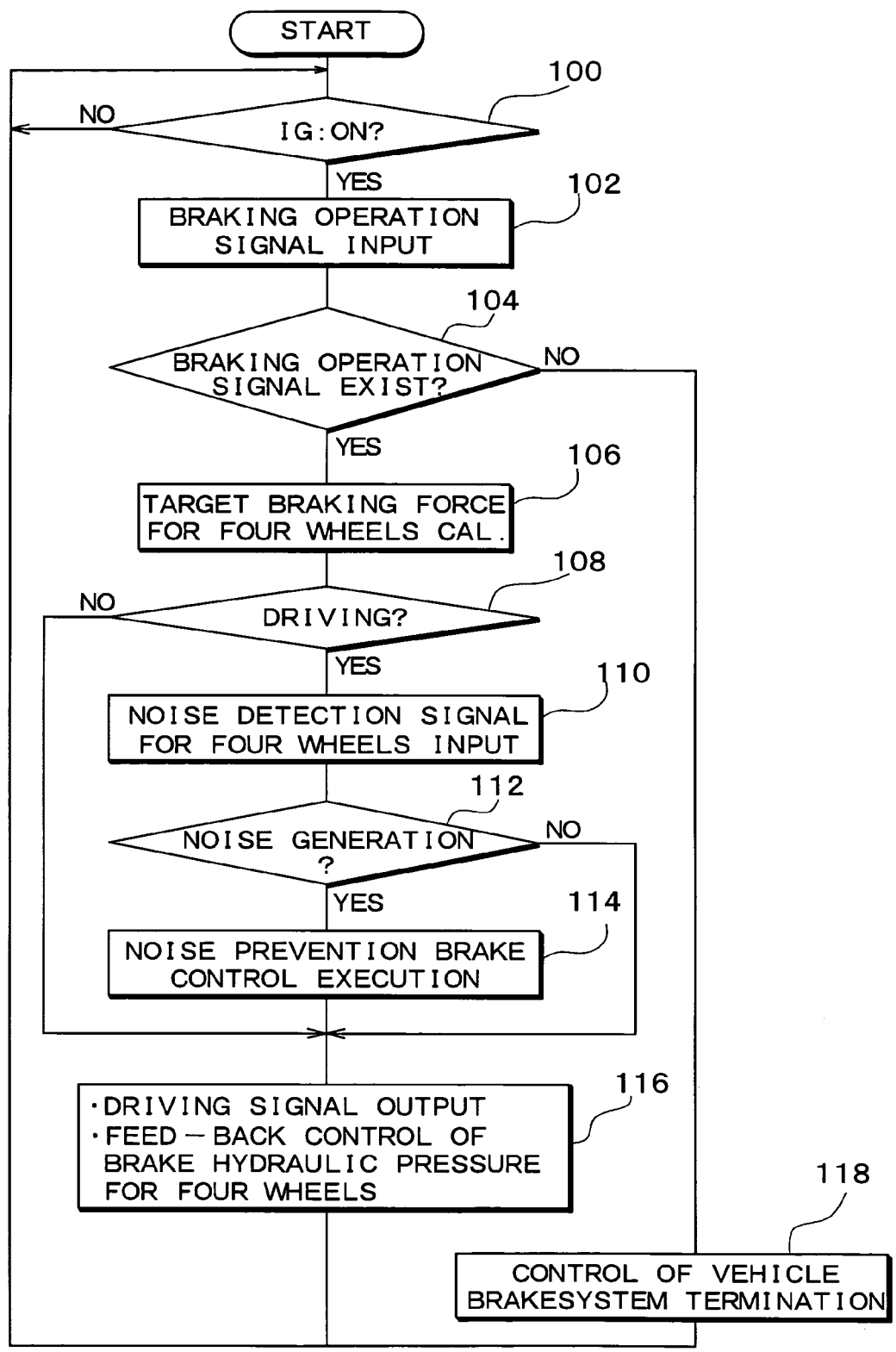
FIG. 3 is a flow chart showing a process content of a main routine of a brake control which is executed by the ECU.

Next, an explanation will be given on a noise prevention brake control in the first embodiment when a brake noise is generated. FIG. 3 is a flow chart showing the process contents of the main routine of the brake control executed by the ECU 10.

At 100 of the procedure, the ECU 10 monitors whether an ignition switch has been turned ON or not. When the ignition is ON, the ECU 10 inputs a braking operation signal at 102 of the procedure, such as a detection signal from a stroke sensor 2 which detects a condition where the brake pedal 1 is depressed.

When the ECU 10 determines that there is no braking operation signal at 104 of the procedure, the procedure proceeds to processing at 118 where the control of the vehicle brake system ends and the procedure returns to the start. When the ECU 10 determines that there is a braking operation signal, the procedure proceeds to processing at 106 where the target braking force for the four individual wheels is calculated based on various sensor signals.

Next, at 108 of the procedure, the ECU 10 determines whether the vehicle is driving or not based on an output signal of each of the wheel speed sensors 19. When the ECU 10 determines that the vehicle is not driving, the procedure proceeds to processing at 116 assuming that the brake noise is not generated. When the ECU 10 determined that the vehicle is driving, noise detection signals, that is, detection signals from individual vibration sensors 18 are input, and the ECU 10 determines whether the noise is generated in at least one of the wheels based on the detection signals from individual vibration sensors 18 at 112. Specifically, the ECU 10 determines that the brake noise is generated in a wheel based on whether the detection signals from the vibration sensors 18 contain frequency component which corresponds to the brake noise (such as approx. 1 kHz to 6 kHz).

If the determination result at 112 of the procedure is NO, the procedure proceeds to processing at 116, and if YES it proceeds to processing at 114 where the noise prevention brake control is executed. This noise prevention brake control will be explained later.

At 116 of the procedure, the ECU 10 executes the feed-back control of the brake hydraulic pressure so as to generate the first to fourth hydraulic pressures in the vehicle brake system. This execution aims to realize the target braking force which was calculated for the individual wheels.

Figure 4:
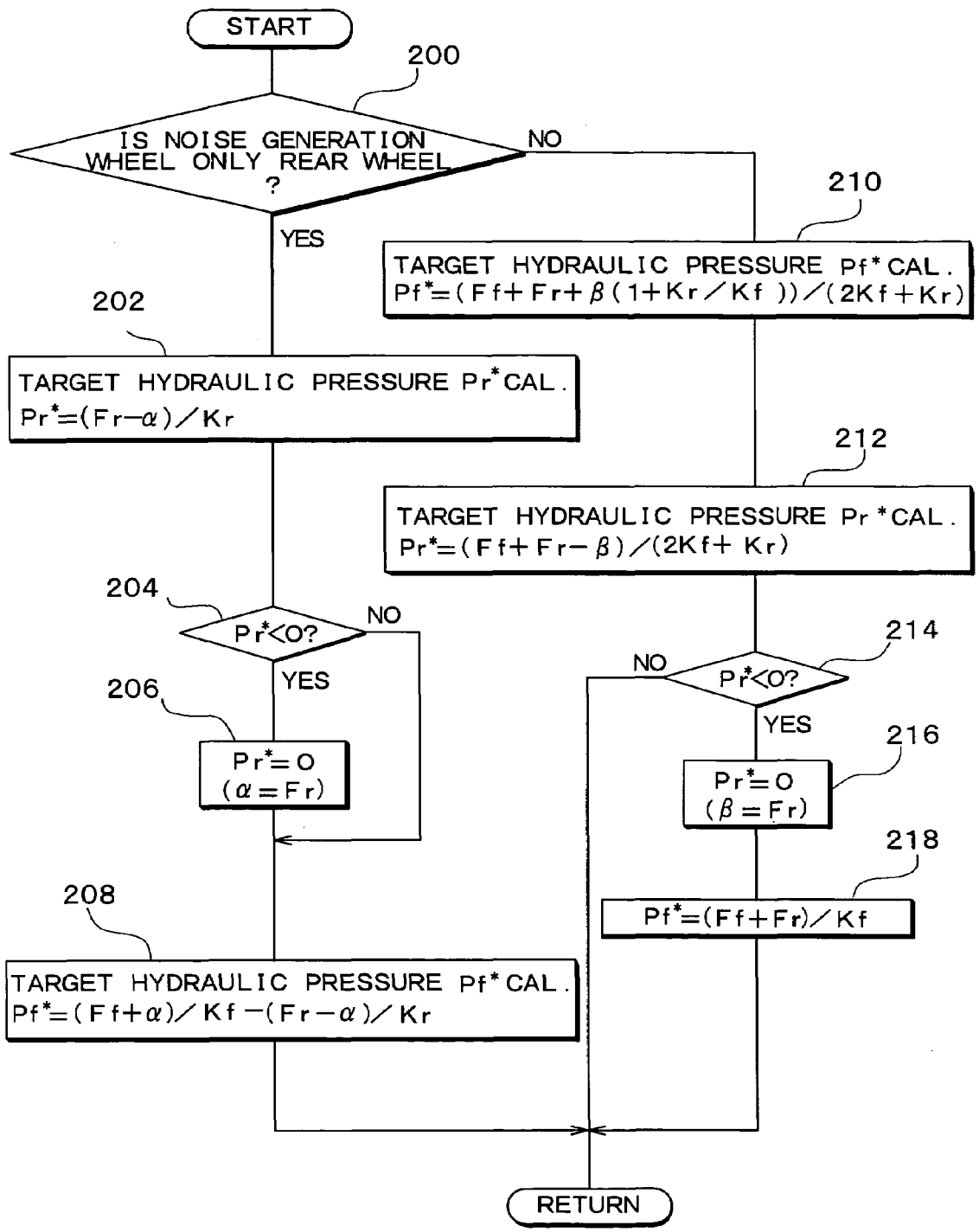
FIG. 4 is a flow chart showing a routine of a noise prevention brake control.

FIG. 4 is a flow chart showing a routine of a noise prevention brake control which is executed at 114. Note that an explanation will be given hereafter on the procedure contents for the front and rear wheels FR and RL on the left side. The same procedure will be also executed for the front and rear wheels FR and RR on the right side at the same time when the procedure is executed for the front and rear wheels FL and RL on the left side.

At 200 of the procedure, the ECU 10 determines whether the brake noise is generated only in the rear wheel based on the output signals from the vibration sensors 18. When the noise is generated only in the left rear wheel RL, the procedure proceeds to processing at 202 where a target hydraulic pressure Pr* of the rear wheel pistons 163RL of the left rear wheel RL, which is a noise generating wheel, is calculated based on Equation 3.

At 204 of the procedure, the ECU 10 determines whether the calculated hydraulic pressure Pr* is a negative value or not. If it is a negative value, Pr* is assumed to be zero at 206, and the procedure proceeds to processing at 208. If Pr* is not a negative value, the procedure proceeds to processing at 208.

At 208 of the procedure, a target hydraulic pressure (first hydraulic pressure) Pf* of the front pistons 161FL of the left front wheel FL, which is on the same side as the noise generating wheel, is calculated on Equation 7.

Accordingly it is possible to determine the first and second hydraulic pressure target values Pf* and Pr*, respectively, which are capable of reducing or suppressing the noise of the left rear wheel RL where the brake noise is generated, while the total braking force of the front and rear wheels on the side where the brake noise is generated is made constant. Therefore, it is possible to make the total braking force of all four wheels constant, and make the total braking force of the front and rear wheels on the side where the brake noise is generated constant, whereby no abnormal vehicle behavior is generated.

On the other hand, when the ECU 10 determines at 200 that the noise generating wheel is not only the right rear wheel, in other words, when the EUC 10 determines that the noise is generated only in the left front wheel FL, or the noise is generated in both the left front wheel FL, the procedure proceeds to processing at 210. At 210 of the procedure, the target hydraulic pressure Pf* on the front pistons 161FL of the left front wheel FL where the noise is generated is calculated based on Equation 11. Next, at 212 of the procedure, the target hydraulic pressure Pr* (the second hydraulic pressure target value) on the rear pistons 162FL of the left front wheel FL and on the rear wheel pistons 163RL of the left rear wheel RL where noise is generated is calculated based on Equation 12.

At 214 of the procedure, the ECU 10 determines whether the thus calculated second hydraulic pressure target value Pr* is a negative value or not. If it is not a negative value, the routine ends and returns to the main routine. If Pr* is a negative value, Pr* is set to be zero at 216 since a negative hydraulic pressure cannot be generated, and at the next 218, Pf* is calculated based on Equation 13.

Accordingly, it is possible to determine the first and second hydraulic pressure target values Pf* and Pr*. The target values enable reducing or suppressing the noise of the left front wheel FL where the brake noise is generated, while the total braking force of the front and rear wheels where the brake noise is generated is made constant. At the same time, the target values enable reducing or suppressing the left rear wheel RL even in the case where the noise is generated in the left rear wheel RL.

In other words, in the left front wheel FL where the noise is generated, the first and second hydraulic pressures to be applied to the front and rear pistons that serve as the first and second pressurizing units such that the difference β in braking force is generated between the front pistons and the rear pistons, whereby the distribution ratio of the braking force between the front and rear within the same caliper is changed. Accordingly, it is possible to reduce or suppress the brake noise. At this time, since the second hydraulic pressure to be applied to the left rear wheel RL which is also on the same side as the left front wheel FL is changed, the braking force in the rear wheel pistons 163RL of the left rear wheel RL that serves as the third pressurizing unit is unavoidably changed, and the value falls out of the noise generating region. Therefore, it is possible to reduce, suppress, or prevent the brake noise in the left rear wheel RL.

Accordingly, the total braking force of all four wheels is made constant, and the total braking force of the front and rear wheels on the side where the noise is generated is also made constant. Therefore, no abnormal vehicle behavior occurs.

As described above, according to the vehicle brake system of the present embodiment, it is possible to change a resonance state by changing a pressure distribution on a contact surface of the friction members within each one of the independently controlled calipers 16FL to 16RR, whereby the brake noise can be suppressed. Accordingly, it is not necessary to provide two calipers for each wheel, and it is possible to suppress the brake noise with a simplified configuration.

Second Embodiment

Next an explanation will be given on a second embodiment. The second embodiment differs from the aforementioned first embodiment in the determination procedure (at 200) for the noise generating wheel in the noise prevention brake control (FIG. 4) executed by the ECU 10. At 200 of the procedure, in the second embodiment, the ECU 10 determines whether the wheel that generates the largest brake noise is a rear wheel or not, in place of whether the noise generating noise is only a rear wheel or not as in the first embodiment. Other procedures in the flow chart in FIG. 4 is the same as those in the first embodiment. Note that in the second embodiment the configuration of the vehicle brake system (FIG. 1), the configuration of the independently controlled calipers 16FL and 16FR (FIG. 2), and the process contents of the main routine (FIG. 3) that the ECU 10 executes are the same as those of the first embodiment. Therefore, an explanation thereof will be omitted.

That is, according to the second embodiment, at 112 of the procedure in the main routine (FIG. 3), the ECU 10 determines the magnitude of the vibration of the brake noise based on the amplitude or the like of the detection signals from the vibration sensors 18FL, 18RL, 18FR and 18RR. Next, at 200 of the procedure, the ECU 10 determines whether the left rear wheel RL is the wheel that generates the largest brake noise. As in the case with the first embodiment, parallel processing is executed for the right front wheel FR and right rear wheel RR.

When the determination result is YES, as in the first embodiment, the ECU 10 executes the processing at 202 or the processing at 208. Accordingly, the ECU 10 determines that the second hydraulic pressure Pr* necessary for reducing or suppressing the noise in the left rear wheel RL that generates the largest noise, and the first hydraulic pressure Pf* which is calculated according to the second hydraulic pressure Pr*. The first and second hydraulic pressures are feedback controlled such that they match the target values Pf* and Pr*.

Therefore, an amount of change a of the braking force can be provided to the rear wheel pistons 163RL that serve as the third pressurizing unit of the left rear wheel RL which generates the largest noise, such that the value falls out of the noise generation region due to the change of the second hydraulic pressure Pr*. Accordingly, it is possible to reduce or suppress the brake noise in the left rear wheel RL. At the same time, it is possible to provide a difference β in the braking force between the front pistons 161FL and the rear pistons 162FL which respectively serve as the first and second pressurizing units of the left front wheel FL on the same side as the left rear wheel RL where the noise is generated, by changing the first hydraulic pressure Pf* under the condition where the total braking force is constant. Therefore, it is possible to reduce, suppress, or further prevent the noise in the left front wheel FL.

When the determination result is NO at 200 of the procedure, that is, if the noise is generated only in the left front wheel FL, or if the noise generated in the left front wheel FL is larger than the noise generated in the left rear wheel RL, either one of the processing at 210 and the processing at 218 is executed. Accordingly, it is possible to determine the first and second hydraulic pressure target values Pf* and Pr* so as to generate a difference β in braking force between the front pistons 161FL and the rear pistons 162FL of the left front wheel FL, whereby it is possible to reduce or suppress the noise of the left front wheel FL where the largest noise is generated.

As described above, the first and second hydraulic pressures Pf* and Pr* that have been changed are respectively provided to the front pistons 161FL and the rear pistons 162FL that serve as the first and second pressurizing units of the left front wheel FL where the largest noise is generated, whereby the difference β is provided between the front pistons 161FL and the rear pistons 162FL. Accordingly, since the distribution ratio of the braking force is changed, it is possible to reduce or suppress the noise in the left front wheel FL. At the same time, the change of the second hydraulic pressure Pr* causes a change in the braking force of the rear wheel pistons 163RL that serve as the third pressurizing unit of the left rear wheel RL which is on the same side as the left front wheel FL. Therefore, it is possible to reduce, suppress, or prevent the noise.

Other Embodiments

In the first and second embodiments, an example is shown where the independently controlled calipers including the first and second pressurizing units are disposed in the left front wheel FL and the right front wheel FR, respectively, and a single line-connected caliper including the third pressurizing unit in the left rear wheel RL and the right rear wheel RR, respectively. However, the inverse arrangement is allowed. That is, single line-connected calipers including the third pressurizing unit may be disposed in the left front wheel FL and the right front wheel FR, respectively, and independently controlled calipers including the first and second pressurizing units may be disposed in the left rear wheel RL and the right rear wheel RR, respectively.

In the aforementioned first and second embodiments, the first hydraulic pressure Pf and the second hydraulic pressure Pr to be applied to the left front wheel FL and the left rear wheel RL of the vehicle are independently controlled, while the total braking force of the left front and rear wheels remains constant. Accordingly, a difference in braking force between the front and rear pistons in the independently controlled calipers 16FL of the left front wheel FL is generated, whereby the noise is reduced or suppressed. (Alternatively, in the case of the right-side wheel of the vehicle, the third hydraulic pressure Pf and the fourth hydraulic pressure Pr to be applied to the right front wheel FR and the right rear wheel RR of the vehicle are independently controlled, while the total braking force of the front and rear wheels on the right side remains constant. Accordingly, a difference in braking force between the front and rear pistons in the independently controlled calipers 16FR of the right front wheel FR is generated, whereby the noise is reduced or suppressed.) The present invention is not limited to this case. That is, the same independently controlled caliper as provided in the front wheels may also be provided in the rear wheels, and the hydraulic pressures to be applied to the front and rear pistons may be independently controlled such that the total braking force of the front and rear pistons for individual wheels is made constant. Accordingly, it is possible to reduce or suppress the brake noise without changing the total braking force for individual wheels.

In the first and second embodiments, four-pod calipers, that is, an opposed caliper which uses a pair of the front pistons and a pair of the rear pistons, i.e., four pistons, are employed for the independently controlled calipers 16FL and 16FR. However, a floating-type caliper which is provided with one each of a front piston and a rear piston may be employed. Even when such a floating-type caliper is employed, it is possible to independently apply the first hydraulic pressure to the single front piston through a brake conduit B1 and the second hydraulic pressure to the single rear piston through a brake conduit B2, as with the same case as the first and second embodiments. Accordingly, a difference $\beta$ in braking force is provided between the front piston and the rear piston in the floating caliper, whereby the brake noise can be reduced, suppressed, or prevented.

In the first and second embodiments, a hydraulic brake system is employed. In other words, a piston generating pressing force using a hydraulic pressure is employed as a pressurizing unit which presses friction members to a brake disc. In place of the hydraulic brake, an electric brake may be used wherein rotational force of the electric motor is converted to a linear motion so as to press the friction members. In this case, two electric motors provided in the independently controlled caliper are independently controlled, and the distribution ratio of the braking force each of which is generated at two portions in the same caliper is changed, whereby the brake noise is reduced, suppressed, or prevented.

While the above description is of the preferred embodiments of the present invention, it should be appreciated that the invention may be modified, altered, or varied without deviating from the scope and fair meaning of the following claims.

What is claimed is:

1. A vehicle brake system comprising:
    a braking force generating unit which provides first, second, third and fourth lines with first, second, third and fourth hydraulic pressures which can be set independently;
    a pair of independently controlled calipers that are disposed in one of a pair of front right and left wheels, respectively, and a pair of rear right and left wheels, respectively; each independently controlled caliper including friction members disposed so as to be pressed to a brake disc rotating with a wheel and also including a first pressurizing unit pressing a first portion of the friction member and a second pressurizing unit pressing a second portion of the friction member toward the brake disc with pressing force corresponding to the hydraulic pressures that are supplied; and
    a single line-connected caliper in the other pair of the front right and left wheels and the rear right and left wheels; the single line-connected caliper including friction members disposed so as to be pressed to brake discs and a third pressurizing unit which presses the friction members with pressing force corresponding to the hydraulic pressure to be applied to the brake disc; wherein the left-side first pressurizing unit is connected to the first line and is applied with the first hydraulic pressure, the left-side second pressurizing unit and the left-side third pressurizing unit are both connected to the second line and are applied with the second hydraulic pressure, and the right-side first pressurizing unit is connected to the third line and is applied with the third hydraulic pressure, and the both right-side second pressurizing unit and the third pressurizing unit are connected to the fourth line and are applied with the fourth hydraulic pressure; and
    a control unit which controls the braking force generating unit so as to change a distribution ratio of the pressing force generated by the first pressurizing unit and the pressing force generated by the second pressurizing unit when a brake noise is generated in at least one of the wheels, by controlling each hydraulic pressure applied to the first pressurizing unit and the second pressurizing unit disposed in the independently controlled caliper which is on the side, either one of the right and left sides, where the brake noise is generated.

2. The vehicle brake system according to claim 1, wherein the control unit controls hydraulic pressures to be applied to the first and second pressurizing units, respectively, such that the total of the pressing force generated by the first pressurizing unit, the pressing force generated by the second pressurizing unit, and the pressing force generated by the third pressurizing unit is constant.

3. The vehicle brake system according to claim 1, wherein
    the first and second portions are positioned at the front and rear with respect to a rotational direction of the brake disc, and
    the control unit executes a control such that the pressing force which presses one of the first and second portions which is at the front with respect to the rotation of the brake disc is larger than the pressing force which presses the other of the first and second portions.

* * * * *